L. H. PERLMAN.
DEMOUNTABLE RIM.
APPLICATION FILED AUG. 16, 1917.
1,326,090. Patented Dec. 23, 1919.
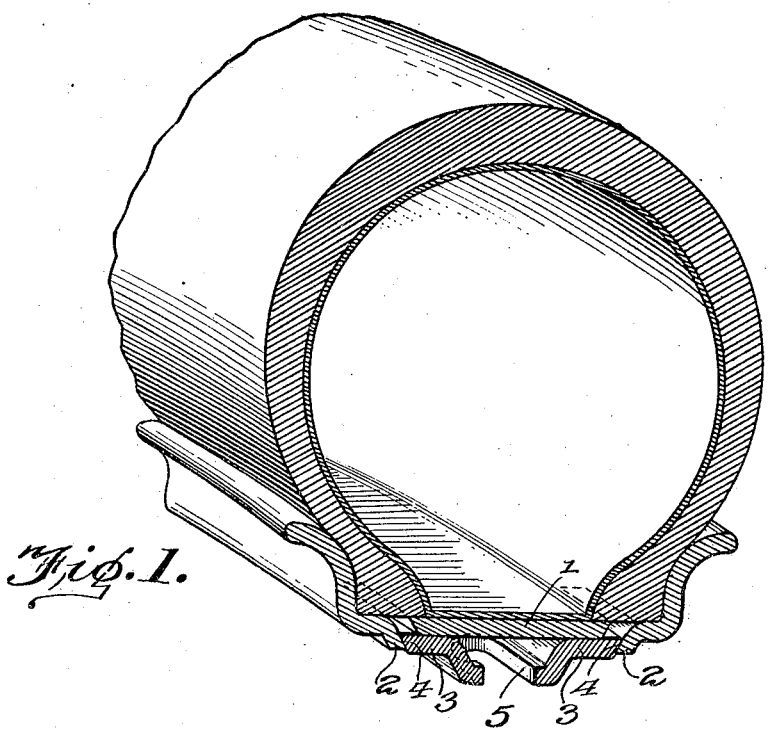
Fig. 1.
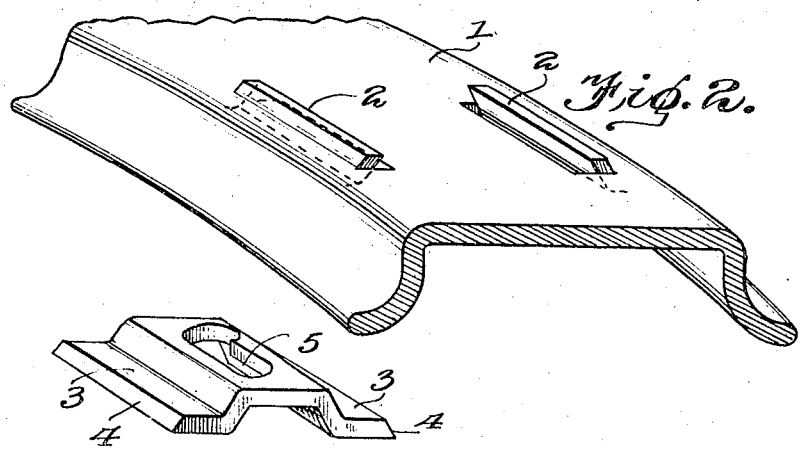
Fig. 2.
Fig. 3.
Witness
H. H. Lybrand
C. H. Fesler
Inventor
Louis H. Perlman,
By Edgar M. Kitchin
Attorney.

UNITED STATES PATENT OFFICE.

LOUIS H. PERLMAN, OF NEW YORK, N. Y.

DEMOUNTABLE RIM.

1,326,090.  Specification of Letters Patent.  Patented Dec. 23, 1919.

Application filed August 16, 1917. Serial No. 186,523.

*To all whom it may concern:*

Be it known that I, LOUIS H. PERLMAN, a citizen of the United States, residing at New York, in the county of New York and State of New York, have invented certain new and useful Improvements in Demountable Rims; and I do hereby declare the following to be a full, clear, and exact description of the invention, such as will enable others skilled in the art to which it appertains to make and use the same.

This invention relates to improvements in demountable rims of the cross-cut type, and more particularly to the method of connection of tool-receiving means for an operating tool for manipulating the rim.

The invention pertains more particularly to the type of rim fully set forth and claimed in my copending application Serial No. 141,636, filed March 19, 1917.

In the accompanying drawing,—

Figure 1 is a perspective view of a fragment of a rim embodying the features of the present invention, a tire being shown in position thereon.

Fig. 2 is a similar view of the same with the tire omitted and the rim shown in an inverted position, the tool-receiving plate being omitted.

Fig. 3 is a similar view of the tool receiving plate detached.

Referring to the drawing by numerals, 1 indicates an ordinary cross-cut demountable rim having flanges 2, 2 stamped inward from the base of the rim and set at an angle such as to incline toward each other and thus produce between the two flanges the equivalent of an under-cut groove. A tool-receiving plate 3 is arranged between the flanges 2 and is formed with beveled edges 4, 4, corresponding to the inclination of the flanges 2. The plate may be held in position between the flanges merely by a tight fit, but is preferably held by having the flanges welded to the edges of the plate which they engage. The flanges are of a length only equal to or preferably slightly less than the thickness of the plate 3 so that said plate rests with its outer face in contact with the inner face of the rim 1. The plate 3 is formed with a slot 5 for receiving the end of a fulcrum post of an operating tool of the type shown in my above-identified co-pending application.

It is to be particularly noted that the flanges 2 are stamped from the material of the base of rim 1 along those lines of the rim falling beneath the inextensible beads of the tire when the tire is mounted in the rim. Thus danger of injury to the inner tube from the presence of the resulting slots caused by the stamping out of the flanges 2 is entirely obviated.

What is claimed is:—

1. The combination of a demountable rim having flanges for receiving a plate for an operating tool, and an operating tool-receiving plate rigidly sustained by said flanges.

2. A demountable rim having flanges stamped from the material of the rim for receiving a plate for an operating tool.

3. A demountable rim having flanges extending inward from the inner face of the rim at an angle relative to each other for producing the effect of an under-cut groove for receiving a tool engaging plate.

4. A demountable rim having flanges stamped from the base of the rim for receiving a plate for an operating tool, said flanges being stamped along lines within the lines occupied by the beads of a tire mounted on said rim.

5. A demountable rim having flanges projecting from its under face, and a tool-receiving plate arranged to engage said flanges edgewise, said plate being connected to the flanges.

6. A demountable rim having flanges projecting from its under face, and a tool-receiving plate arranged to engage said flanges edgewise, said plate being welded to the flanges.

7. The combination of a demountable rim having flanges stamped from the material of the base of the rim for receiving a plate for an operating tool, and a tool-receiving plate arranged between said flanges and rigidly connected to the base of the rim by the flanges.

In testimony whereof I affix my signature in presence of two witnesses.

LOUIS H. PERLMAN.

Witnesses:
I. B. LEIBSON,
E. M. FRÜHLING.